Jan. 30, 1923.

J. H. CHAMBERS.
SHOCK ABSORBER.
FILED FEB. 2, 1920.

1,443,617.

WITNESSES:
Wm H. Donham

INVENTOR.
J. H. Chambers

Patented Jan. 30, 1923.

1,443,617

UNITED STATES PATENT OFFICE.

JAMES HENRY CHAMBERS, OF CALWA, CALIFORNIA.

SHOCK ABSORBER.

Application filed February 2, 1920. Serial No. 355,602.

*To all whom it may concern:*

Be it known that I, JAMES H. CHAMBERS, a citizen of the United States, residing at Calwa, in the county of Fresno and State of California, have invented new and useful Improvements in Shock Absorbers, of which the following is a specification.

The object of my present invention is the provision of a simple and efficient shock absorber designed to be used in conjunction with an ordinary chassis portion and spring of an automobile.

To the attainment of the foregoing the invention consists in the improvement as hereinafter described and definitely claimed.

In the accompanying drawings, hereby made a part hereof:—

Figure 1:
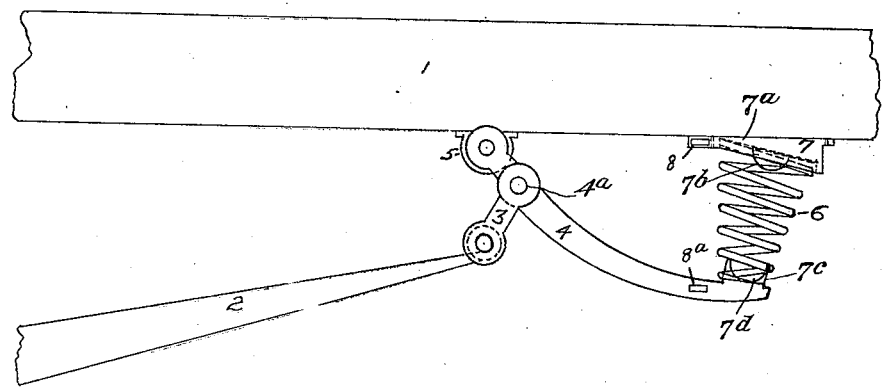
Figure 1 is a view illustrating the arrangement of my improvement relatively to the front spring of an automobile.

Reference will first be made to Figure 1. In Figure 1 a chassis portion is designated 1, and the end portion of a front spring is designated 2.

In furtherance of my invention I affix a bracket 5 to the underside of the chassis portion 1, and I similarly affix a seat 7, having an oblique face $7^a$ and also having a central rounded protuberance $7^b$. I also preferably provide the seat 7 with an apertured lug 8.

On the end of the spring 2 I pivot a link 3, and to the bracket 5 I pivot a lever 4 that is pivotally connected at an intermediate point $4^a$ of its length to the link 3. On its upper side and adjacent to its free end the lever 4 is provided with a cup-shaped protuberance $7^c$ in which is a rounded socket $7^d$ adapted to register with and receive the protuberance $7^b$ when the spring 6 is fully compressed. The said spring 6 is of the helical type and has its upper end disposed in the seat 7 and its lower end coiled about the protuberance $7^c$. At the point $8^a$ I prefer to provide the lever 4 with an apertured lug similar to the lug 8 on the seat 7. The said lugs 8 and $8^a$ are not of the essence of my invention, the same being provided for the connection of a strap (not shown) the function of which is to limit the movement of the free end of the lever 4 away from the chassis portion 1.

In the practical use of my improvement it will be observed that the shock absorber will serve in an auxiliary capacity to assist the spring 2 in cushioning the chassis portion 1 and in preventing the transmission of shocks and jars to said chassis portion.

Figure 2:
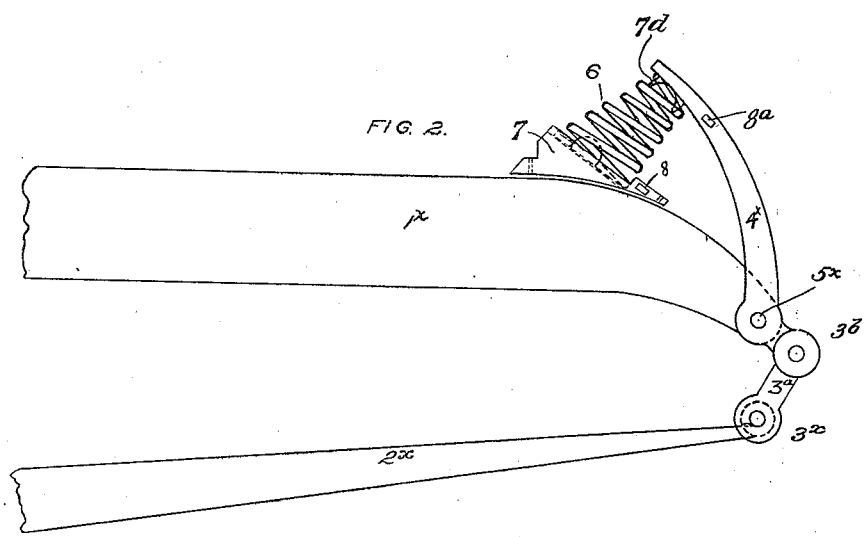
Figure 2 is a view showing the improvement as properly arranged relatively to the rear spring of an automobile.

In the embodiment shown in Figure 2 the lever $4^x$ is pivoted at $5^x$ on the chassis portion $1^x$, and the rear spring $2^x$ is connected at $3^x$ to the link $3^a$ which link $3^a$, in turn, is pivotally connected at $3^b$ to the end of the lever $4^x$. The seat 7 and the lever protuberance $7^d$ are arranged as shown relatively to the chassis portion $1^x$ and the lever $4^x$; the lever $4^x$ overhanging the end portion of the chassis portion $1^x$, and the seat 7 and spring 6 being arranged at the upper side of the chassis portion $1^x$ instead of at the lower thereof as shown in Figure 1. The general operation of the embodiment shown in Figure 2 is similar to that of the embodiment shown in Figure 1 and need not therefore be repeated.

Having described my invention, what I claim and desire to secure by Letters Patent, is:—

1. The herein described shock absorber comprising in combination with the chassis portion of a vehicle, a spring arranged below and spaced from said portion, a link pivotally connected at one end to one end of the spring and extending upwardly therefrom, a lever fulcrumed on the chassis portion and above the spring and pivotally connected to the upper end of said link and having a free arm movable vertically in spaced and opposed relation to the chassis portion, and a coiled spring interposed and secured between the end portion of the free arm of the lever and the chassis portion.

2. A shock absorber comprising in combination with a vehicle frame and axle a leaf spring attached to said axle and extending longitudinally with respect to said frame, an upstanding link connected to the rear end of said spring, a lever pivotally attached to said frame intermediate its ends, and to said link adjacent one end thereof, a coil spring interposed between the opposite end of said lever and frame.

In testimony whereof I affix my signature in the presence of two witnesses this 31st day of December A. D. 1919.

JAMES HENRY CHAMBERS.

Witnesses:
 B. O. GHOLSON,
 H. C. BURDENE.